United States Patent [19]

Kramer

[11] Patent Number: 4,570,739
[45] Date of Patent: Feb. 18, 1986

[54] PERSONAL MOBILITY VEHICLE

[75] Inventor: DuWayne E. Kramer, Mission, Kans.

[73] Assignee: Burke, Inc., Mission, Kans.

[21] Appl. No.: 537,297

[22] Filed: Sep. 29, 1983

[51] Int. Cl.⁴ ............................................ B62D 61/08
[52] U.S. Cl. .................................. 180/216; 180/65.1; 180/208; 180/907; 280/DIG. 5
[58] Field of Search ............... 180/208, 216, 217, 65.1, 180/907; 280/DIG. 5

[56] References Cited

U.S. PATENT DOCUMENTS

| D. 269,960 | 8/1983 | Cosper | D12/14 |
|---|---|---|---|
| 3,108,481 | 10/1963 | Westmont | 180/217 |
| 3,249,171 | 5/1966 | Kinghorn | 180/208 |
| 3,388,761 | 6/1968 | Arpin | 180/208 |
| 3,605,929 | 9/1971 | Rolland | 180/208 |

FOREIGN PATENT DOCUMENTS 71361 12/1946 Norway ............... 180/216

OTHER PUBLICATIONS

"Voyager VI", Voyager, Inc.
"Voyager II Operation and Maintenance Manual", Voyager, Inc., 1977.
"Voyager IV", Voyager, Inc., 1978.
"Portascoot", E. F. Brewer Co.
"Portascoot—The Alternative", E. F. Brewer Co.
"Scoota", A-BEC.
"Amigo", sales pamphlet.

*Primary Examiner*—John J. Love
*Assistant Examiner*—Kenneth R. Rice
*Attorney, Agent, or Firm*—Litman, Day and McMahon

[57] ABSTRACT

A personal mobility vehicle includes a floor pan with a rear drive unit at one end and a steerable front wheel at the other end. The drive unit is separable from the floor pan and includes spaced apart, differentially connected rear wheels, an electric motor, and belts and pulleys drivingly connecting the motor to a differential unit. The front wheel is steered by a tiller. A seat with a folding back is removably connected to the floor pan toward the pan rear end to concentrate the weight of the driver over the rear wheels to aid in traction. A brake is provided on the front wheel and is lockable for parking purposes. Each of the drive unit, seat unit, a battery, and a floor pan unit weighs less than thirty pounds such that the separated components can be easily lifted and manipulated for transportation of the vehicle between sites of use.

17 Claims, 10 Drawing Figures

PERSONAL MOBILITY VEHICLE

FIELD OF THE INVENTION

The present invention relates to personal mobility devices and, more particularly, to a self-propelled vehicle including a separable rear wheel drive unit and other separable components which can be lifted and manipulated with relative ease.

BACKGROUND OF THE INVENTION

Persons with partial and total walking disabilities have traditionally relied upon wheelchairs for locomotion. Wheelchairs generally have relatively widely spaced wheels for lateral stability and to comfortably accommodate the occupant. Persons in wheelchairs can move with relative ease in places such as hospitals which are usually provided with extra wide doors and halls and inclined ramps between vertically displaced levels. However, private homes and work places are generally not planned specifically to accommodate wheelchairs. While wheelchairs are generally resistant to lateral tipping, they are often designed for tipping backwards so that an attendant pushing a patient in a wheelchair can tip the front wheels up to negotiate such obstacles as steps, threshholds, and the like. While such a configuration is useful when the wheelchair is pushed by an attendant, the design presents some hazards when the wheelchair occupant attempts to wheel himself up a ramp. Further, there is a degree of social stigma attached to wheelchairs such that wheelchair occupants are sometimes shunned as "handicapped".

In order to overcome some of the problems associated with wheelchairs, the medical equipment industry has developed small personal mobility vehicles as an alternative. Such vehicles generally have a pair of rear wheels, a steerable front wheel, are powered, and in general have the appearance of a downsized golf cart. The track of the rear wheels is generally narrower than that of wheelchairs, the wheel base is generally longer than that of wheelchairs, and the vehicles are usually designed for tight turning radii such that the vehicles are more maneuverable than wheelchairs and, therefore, more useful in places which are not specifically designed for wheelchair use.

Of the known vehicles of this type, most are front wheel driven. One of the problems with front wheel drive in such vehicles is that the weight of the occupant is usually concentrated near the rear wheels such that when there is resistance to motion of the vehicle as in ascending ramps, the driven front wheel simply spins. In the only known rear wheel drive unit, each of the rear wheels is driven by its own motor and the wheels are differentially interconnected. In addition, this particular vehicle employs a pair of batteries. The use of duplicate motors and batteries results in a vehicle which is substantially heavier than the majority of such vehicles. Consequently, such vehicles are generally restricted to a single site of use unless transport means such as a van with a lift platform is available. In contrast, most of the front wheel drive vehicles are separable into component parts which are light enough to be easily lifted for placement in an automobile trunk for transportation to other sites of use.

SUMMARY OF THE INVENTION

The present invention attempts to optimize the design of personal mobility vehicles by providing a rear wheel design wherein the rear wheels are differentially connected. The rear wheels, differential unit, motor, and a drive unit frame comprise a drive unit which is separable from a floor pan unit having the front wheel, and steering gear thereon. The seat unit is foldable for compactness and is also removable from the floor pan unit. The personal mobility vehicle according to the present invention comprises a drive unit, a floor pan unit, a seat unit, and a battery pack with each component weighing less than thirty pounds and being compact such that the vehicle is conveniently separated into components for lifting into a trunk of an automobile or placement in another vehicle for transportation to other sites. Further, the use of driven rear wheels utilizes the weight of the driver to aid in traction.

OBJECTS OF THE INVENTION

The principal objects of the present invention are: to provide a device to facilitate locomotion by partially handicapped persons; to provide an improved personal mobility vehicle which may be disassembled into a few relatively light and compact components which can be lifted with relative ease for placement in an automobile for transporting between sites of use; to provide such a vehicle which though light in weight is sturdy and stable in use; to provide such a vehicle having traction capabilities for climbing inclined ramps built at least to Veterans Administration requirements; to provide such a vehicle having a steerable front wheel and a pair of driven rear wheels; to provide such a vehicle wherein the rear wheels are differentially connected to allow tight turning radii; to provide such a vehicle wherein one of the separable components is a drive unit including the rear wheels, a battery powered motor, speed reduction belts and pulleys, a relay box, and a frame interconnecting same; to provide such a vehicle including an adjustably positionable steering tiller for adjustment to the dimensions of the driver and for collapsing the tiller for compact transport of the vehicle; to provide such a vehicle including a comfortable seat which is adjustably positionable, foldable, and removable; to provide such a vehicle including a speed reduction brake which is lockable for parking purposes; to provide such a vehicle including control switches which are conveniently placed; to provide such a vehicle which is attractive in appearance; and to provide such a vehicle which is economical to manufacture, durable and safe in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
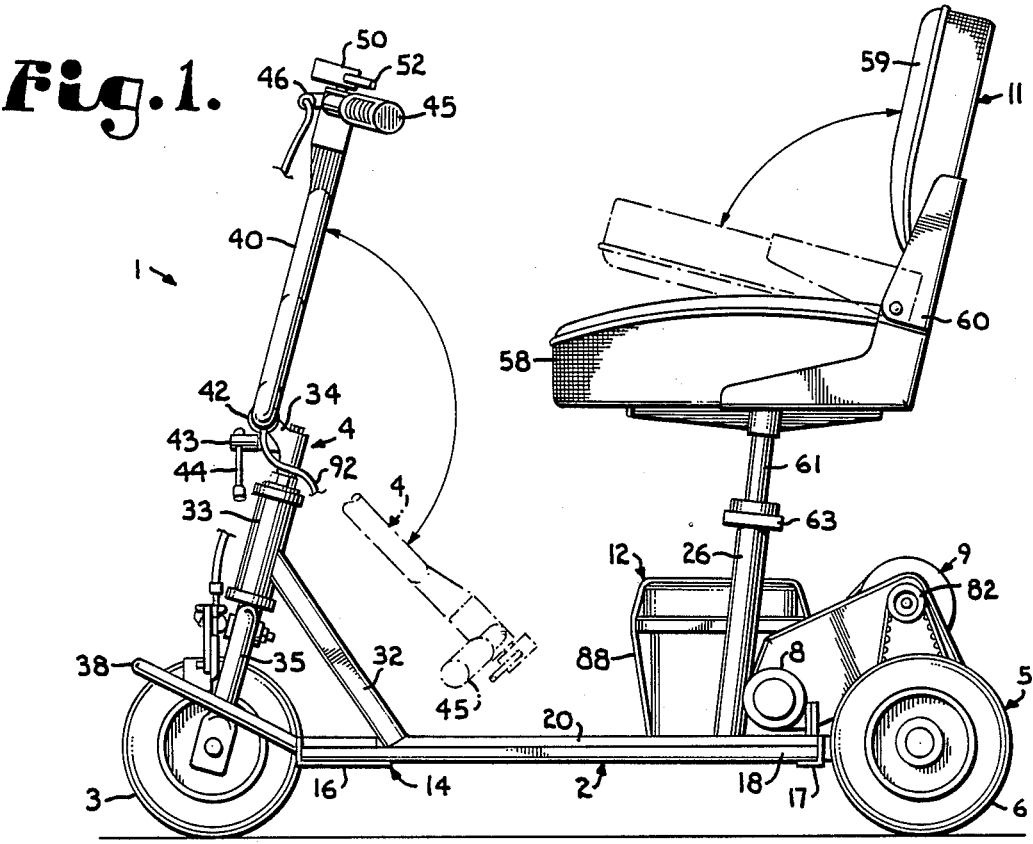
FIG. 1 is a side elevational view of a personal mobility vehicle according to the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a personal mobility vehicle including a floor pan unit 2 which is the main framework of the vehicle and includes a front wheel 3 and steering gear 4; a drive unit 5 including rear wheels 6 and 7, an electric motor 8, a transmission 9 and a drive unit frame 10; a seat unit 11; and a battery pack 12.

In the illustrated vehicle 1, the floor pan unit 2 includes a floor pan frame 14 composed of a center beam 15, a front lateral member 16, and a rear lateral member 17. The center beam 15 is a square cross-section tube and extends from just behind the front wheel 3 to a rear end 18 of the floor pan unit 2. The front and rear lateral members 16 and 17 are angle stock and are welded to the center beam 15. The rear member 17 is straight while the front member is composed of a plurality of segments joined in such a manner to form a recess to provide clearance for the steering wheel 3 for rotation thereof to steer the vehicle 1. The center beam 15 and members 16 and 17 are preferably formed of steel for strength. A floor pan 19 is attached to the floor pan frame 14 as by means of bolts. The floor pan 19 is sheet metal such as aircraft aluminum and has a raised center ridge 20 which runs along the center beam 15 to allow lower placement of side portion 21 of the pan 19. The side portions 21 may be carpeted with floor mats 22 as of felt or other material. The outer edges 23 of the floor pan 19 are upturned to strengthen the side portions 21. For safety reasons, the edges 23 should be less than one inch higher than the side portions 21 to avoid tripping the rider of the vehicle 1 especially during exit therefrom. A seat tube 26 is welded to the center beam 15 near the rear end 18 of the floor pan unit 2 and extends upwardly. The seat tube 26 receives and supports the removable seat unit 11.

The rear end of the center beam 15 is enlarged to form a nonround socket or mortise 27 to provide a guide for connection of the drive unit 5 to the floor pan unit 2. The rear lateral member 17 has rearwardly extending tabs 28 with apertures 29 therethrough for securing the drive unit 5 to the floor pan unit 2. The tabs 28 are illustrated as inverted L-shaped brackets welded to the rear lateral member 17.

A steering gear supporting strut 32 extends forwardly and upwardly of the center beam 15 and has a head tube 33 welded to an end thereof. A spindle (not shown) is rotatably mounted within the head tube 33 and has a tiller supporting stem 34 connected to its top end and a front wheel supporting fork 35 connected its lower end. The head tube 33, stem 34, and fork 35 are similar to the headset components of conventional bicycles. The front wheel 3 is rotatably mounted on the fork 35 by means of a front axle 36 extending between the legs of the fork 35. A cable operated bicycle type caliper brake 37 is positioned on the fork 35 for clamping engagement with the front wheel 3 for slowing, stopping, and parking the vehicle 1. The illustrated vehicle 1 includes an arcuate footrest 38 attached to the front lateral member 16 and which encircles the front wheel 3.

Figure 2:
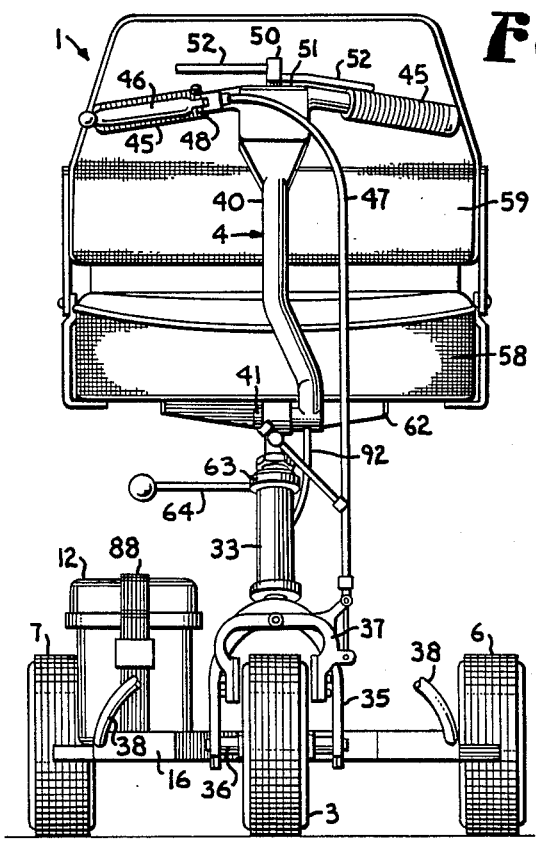
FIG. 2 is a front elevational view of the personal mobility vehicle.
Figure 3:
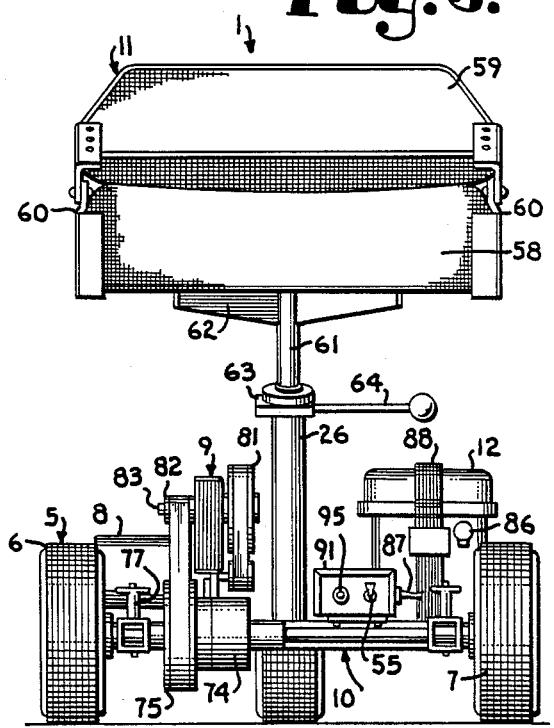
FIG. 3 is a rear elevational view of the vehicle with a seat back thereof shown in a folded position.

The steering gear 4 includes a tiller 40 pivotally connected to the stem 34 by reception of a lower end 41 of the tiller in a clamp 42 of the stem 34. A threaded bolt 43 with a bolt lever 44 is employed to adjustably fix the angular position of the tiller 40. On an upper end of the tiller, opposed handle bars 45 are positioned for rotating the front wheel 3 to steer the vehicle 1. A brake lever 46 is clamped onto one of the handle bars 45 and has a brake cable 47 extending therefrom and connected with the brake 37. The brake 37 is operated to clamp and engage the front wheel 3 by pivoting the brake lever toward the handle bars 45 on which it is positioned. The vehicle 1 is preferably provided with a parking brake; and as illustrated in FIG. 2, a parking brake pin 48 is received through alignable apertures (not shown) in portions of the brake lever 46 to fix the lever 46 in a braked position to maintain the pads of the brake 37 in clamped engagement with the front wheel 3.

Figure 4:
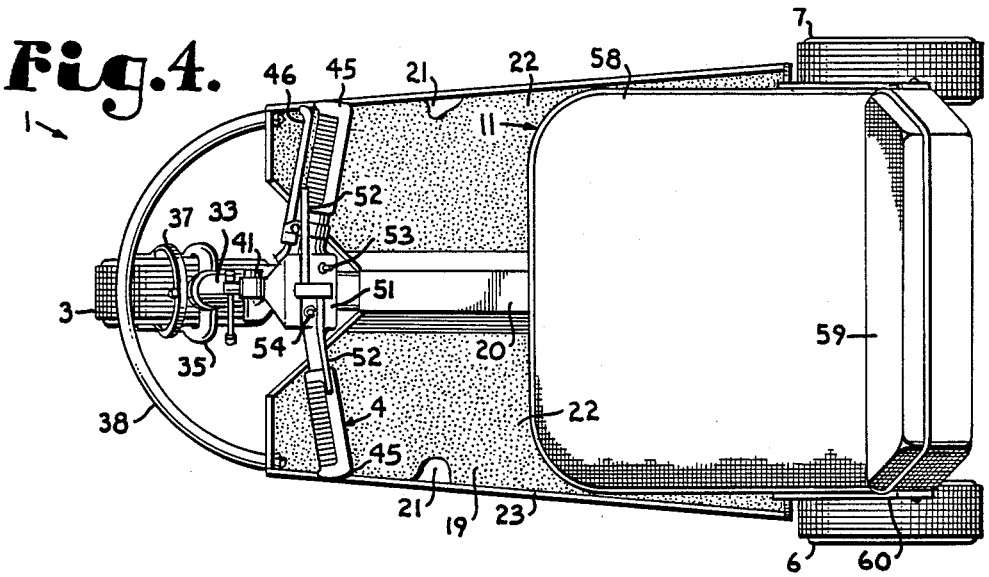
FIG. 4 is a top plan view of the personal mobility vehicle.
Figure 5:
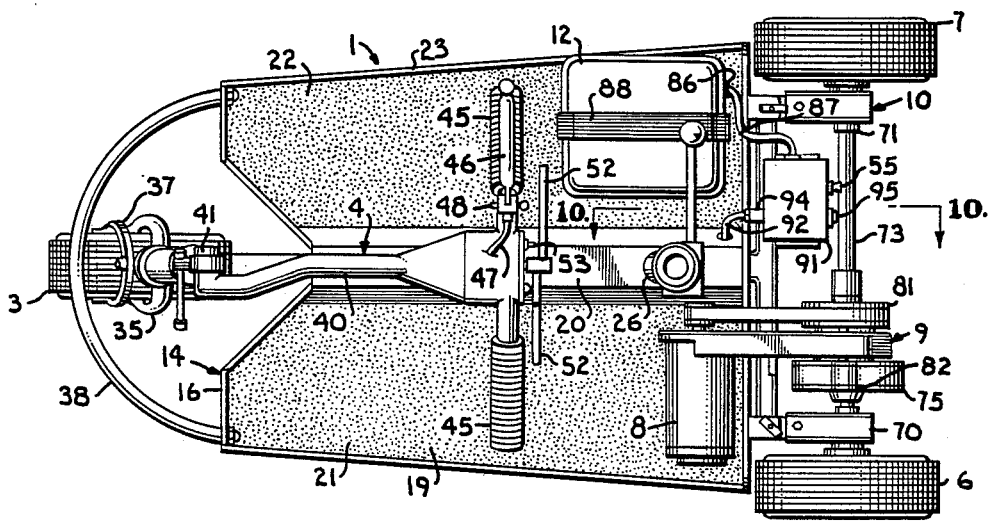
FIG. 5 is a view similar to FIG. 4 with the seat unit of the vehicle removed to illustrate details of the drive unit and with a tiller of the vehicle shown in a folded position.

Control switches for operating the motor 8 to propel the vehicle 1 may be provided at any convenient place on the vehicle. As illustrated in FIG. 4, a drive control switch lever 50 is provided on a top end surface or console 51 of the tiller 40. The switch lever 50 is mechanically connected to a double switch mechanism (not shown) which provides for two-speed operation of the electric motor 8. The switch lever 50 preferably has opposed lever extensions 52 extending toward each of the handle bars 45 for operation by either right or left handed riders. A three position direction switch 53 is also provided on the console 51. The direction switch 53 conveniently has a forward drive position toward the front of the vehicle 1, a reverse drive position toward the rear of the vehicle, and an intermediate neutral position. The direction switch 53 is operable to reverse the polarity of the battery voltage applied to the motor 8 to reverse the motor rotation. An indicator light such as an LED 54 is provided on the console 51 to advise the rider that a main on/off switch 55 is in the "on" position such that electrical power is available to operate the vehicle 1.

The illustrated seat unit 11 includes a seat cushion 58 and a seat back cushion 59. A pair of hinge brackets 60 pivotally connect the seat back 59 to the seat cushion 58. The seat unit 11 is mounted on the vehicle 1 by a seat post 61 received in the seat tube 26. The seat post 61 is connected to the seat cushion 58 by a radial member seat support frame 62. Preferably, the seat unit 11 is adjustable in height to accommodate different sized riders. It is generally recommended that the seat unit be placed at its lowest comfortable position during riding to maximize the stability of the vehicle 1. However, under other circumstances, it might be desirable to raise the seat unit 11, such as for use of the vehicle 1 as a chair at a table or desk. In such a circumstance, it is also desirable for the seat unit to be rotatable. In order to lock the position of the seat unit 11, a seat tube clamp 63 is provided. The clamp 63 is locked or released by operation of a seat clamp lever 64. For transportation of the vehicle 1 as in the trunk of a car, the seat back 59 may be folded down toward the cushion 58, and the seat unit 11 may be removed from the vehicle 1 by releasing the clamp 63 and lifting the unit 11 from the seat supporting tube 26.

Figure 6:
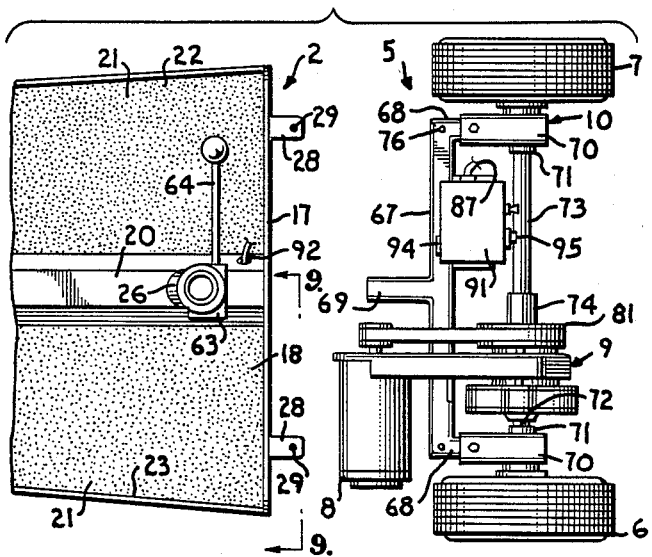
FIG. 6 is a fragmentary plan view of the vehicle with the drive unit shown separated from the floor pan unit.
Figure 7:
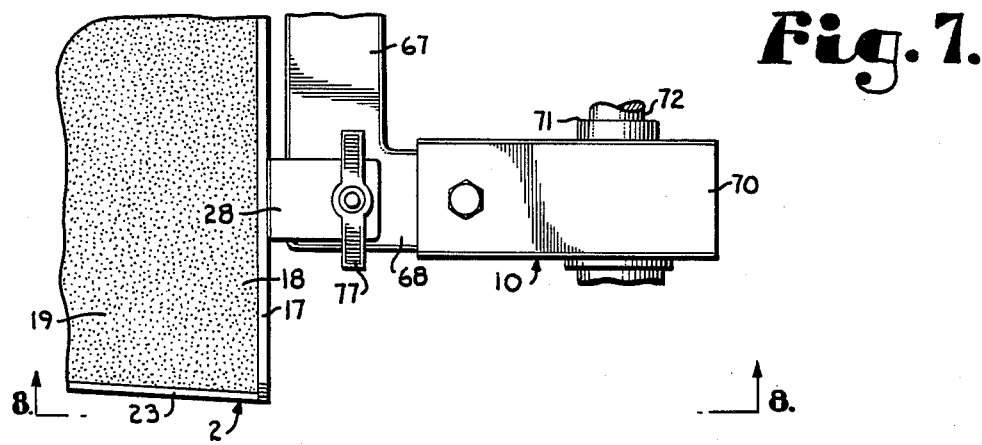
FIG. 7 is an enlarged fragmentary top plan view illustrating structure for connecting the drive unit to the floor pan unit.
Figure 8:
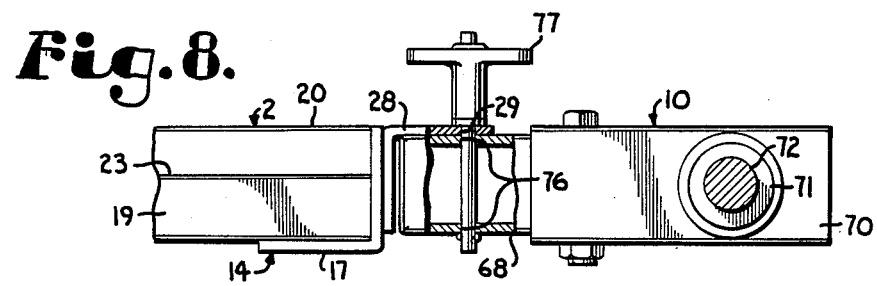
FIG. 8 is an enlarged fragmentary side view taken on line 8—8 of FIG. 7 and illustrates additional details of the connecting structure.
Figure 9:
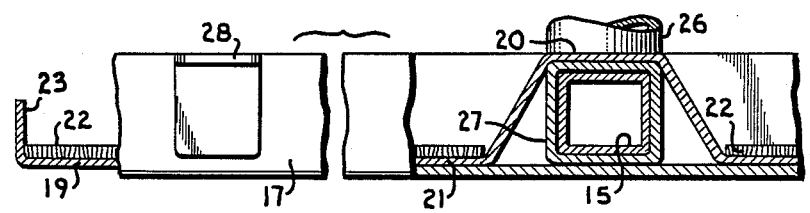
FIG. 9 is an enlarged fragmentary transverse view taken on line 9—9 of FIG. 6 and illustrates guide structure for positioning the drive unit relative to the floor pan unit.
Figure 10:
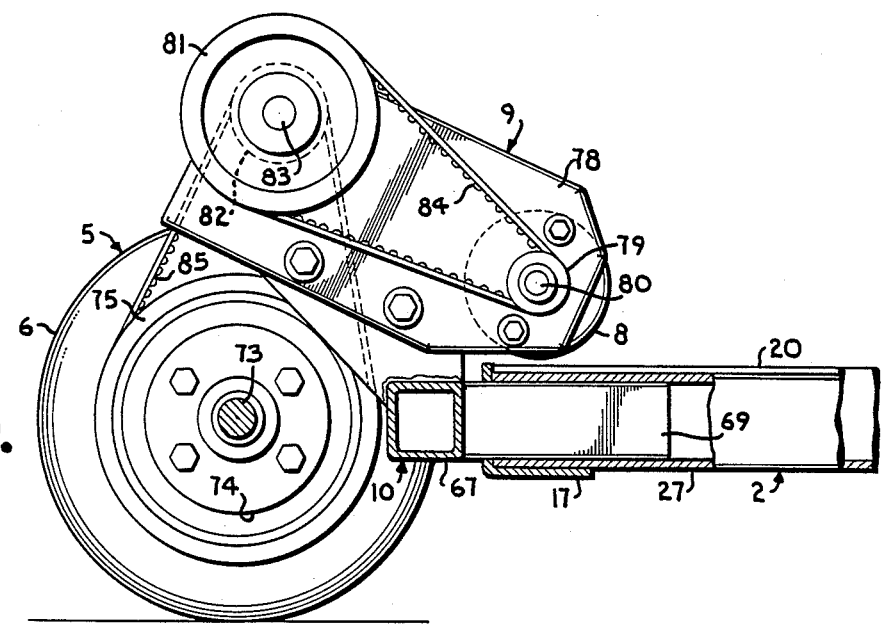
FIG. 10 is an enlarged fragmentary longitudinal sectional view taken on line 10—10 of FIG. 5 and illustrates details of the drive transmission of the drive unit.

Referring to FIG. 6, the drive unit frame 10 includes a cross member 67, trailing side arms 68, and a forwardly extending bar or tenon 69. The tenon 69 is non-round in cross-section and is sized for reception in the mortise or socket 27 of the center beam 15 for connection of the drive unit 5 to the floor pan frame 14. As illustrated in FIG. 6, the trailing arms 68 have extension sleeves 70 in which are mounted bearings 71 to rotatably support left and right axle portions respectively 72 and 73 on which the left and right rear wheels 6 and 7 are mounted. The left and right rear axle portions 72 and 73 are interconnected by a differential gear unit 74 having a toothed differential pulley 75 thereon which is connected through the transmission 9 to the electric motor 8 for rotation of the rear wheels 6 and 7 to propel the vehicle 1. The differential unit 74 provides different rotation rates of the rear wheels 6 and 7 to allow tighter turns of the vehicle 1 than would be possible with a solid axle interconnecting the rear wheels 6 and 7. The cross member 67 has apertures 76 for alignment with the apertures 29 on the tabs 28 when the tenon 69 is received in the mortise 27 of the floor pan unit 2 to connect the drive unit 5 to the floor pan unit 2. Locking pins 77, such as aircraft type bayonet pins, are received in the aligned apertures 29 and 76 for securing the drive unit 5 to the floor pan 2.

A transmission bracket 78 is mounted on the cross member 67 and supports the motor 8. The illustrated motor 8 is a reversible DC motor capable of developing approximately one quarter horsepower and 100 inch-pounds of torque. The maximum rotation speed of the motor 8 is approximately 2,500 revolutions per minute. The motor 8 has a toothed motor pulley 79 positioned on a motor shaft 80 thereof. The transmission bracket 78 rotatably supports a speed reduction pulley set including a large idler pulley 81 and a small idler pulley 82 on a common idler shaft 83. The idler pulleys 81 and 82 are toothed pulleys. An endless toothed motor belt 84 is trained about the motor pulley 79 and the large idler pulley 81; and an endless toothed differential belt 85 is trained about the small idler pulley 82 and the differential pulley 75. The motor 8 in cooperation with the transmission 9 propels the vehicle 1 at a fast walking pace or about four miles per hour.

The motor 8 is powered by a rechargeable battery within the battery pack or case 12. The preferred type of battery is of the jelled cell type to avoid leakage of battery chemicals should the battery pack be upset and for the ease of maintenance of such cells. The battery is of the size employed on small boats as starting motors and weighs about twenty pounds. The case 12 encloses and protects the battery and has a socket 86 to receive a connector of a battery cable 87. The socket 86 also enables connection of a battery charger (not shown) for replenishing the battery charge. The battery case 12 has a handle or a strap 88 for lifting and carrying the battery for convenience in recharging same. Normally, the battery pack 12 is positioned on one of the side portions 21 of the floor pan 19 during use.

Switching logic for controlling the speed and direction of the motor 8 is provided by relays (not shown) housed within a relay box 91 which is mounted on the drive unit frame 10. The main on/off switch 55 is mounted on the relay box 91, and the battery cable 87 extends from the box 91. A switch cable 92 extending from the direction switch 53 and the drive switch operated by the drive control 50 is routed under the floor pan ridge 20 and exits near the rear end 18 of the pan unit 2. A switch cable connector or plug is mounted on the end of the cable 92 for reception in a socket 94 mounted on the relay box 91. When the drive unit 5 is to be detached from the floor pan unit 2, the cables 87 and 92 are disconnected respectively from the sockets 86 and 94.

The vehicle 1 is provided with a low speed torque control 95 which is mounted on the relay box 91 to compensate for the weight of the rider. This is desirable to avoid an abupt start when the vehicle 1 is ridden by a relatively lightweight person. The control 95 consists of a high wattage resistor and a means to vary the resistance of same. Such a control could consist of a plurality of such resistors with a multiple position switch or a rheostat. The preferred low speed torque control is a carbon pile whose resistance is varied inversely to the mechanical pressure applied thereto. In general, the control 95 only needs to be set once for a single rider of a given weight. The transition between the low speed and high speed of the vehicle, as controlled by the lever 50, is less abrupt for any given weight person than for the transition to motion from a stopped state.

In use of the vehicle 1, the drive unit 5 is attached to the floor pan unit 2; the tiller 40 is folded to an upright position; and the seat unit 11 is installed and unfolded. The battery pack 12 is disconnected from a charging unit and placed on one of the side portions 21 of the floor pan 19. The battery cable 87 is connected to the battery socket 86, and the switch cable 92 is connected to the switch cable socket 94. The on/off switch 55 is placed in the "on" position which may be verified by reference to the pilot light 54, and if necessary the starting torque control 95 is adjusted according to the weight of the rider. The rider sits on the seat 58 and places his or her feet on the side portions 21 of the floor pan 19, on the foot rest 38, or a comfortable compromise therebetween, and the tiller 40 is adjusted to a comfortable position. The parking brake pin 48 is removed to release the brake 37, and the direction switch 53 is positioned in the drive direction, either forward or reverse. The drive control lever 50 is rotated a short distance until the vehicle 1 begins to move. Once in motion, if desirable, the control 50 may be advanced to the high speed position. Preferably, a detent is provided in the control 50 so that the difference between the low speed, high speed, and stop position can be discerned by touch. Steering is controlled by rotation of the tiller 40.

While the vehicle 1 is designed primarily for indoor use, limited outdoor use is not precluded. Outdoor use should be restricted to paved surfaces such as sidewalks, driveways, and the like to prevent unnecessary contamination of the drive components by dirt, sand, grass, etc. Because of the low speed of the vehicle 1, operation of the vehicle on streets should be avoided, except for crossing streets and then with great caution. Additionally, steep inclines should be avoided. However, the vehicle 1 is fully capable of operation on wheelchair ramps to a grade of about twenty-five percent. Descending such ramps under control is aided by a regenerative braking feature of the motor. Alternatively, the brake 37 may be used to slow and stop the vehicle in combination with the release of the control lever 50.

When used indoors, turns should be made at a slow speed to avoid the possibility of lateral tipping, and care should be taken when space is restricted. When used in high traffic areas, such as in a work place, it might be advisable to equip the vehicle with a horn or bell for warning pedestrians approached from behind and for sounding prior to making blind turns.

When it is desired to transport the vehicle 1 to a different site of use, the vehicle may be separated into its various units and lifted into a trunk of an automobile or the like with relative ease.

It is to be understood that while certain forms of the present invention have been illustrated and described herein, it is not to be limited to the specific forms or arrangement of parts described and shown.

What is claimed and desired to be secured by Letters Patent is as follows:

1. A personal mobility vehicle comprising:
   (a) a main frame unit including:
     (1) a floor pan having a back end;
     (2) a front wheel spindle pivotally connected to said pan.
     (3) a front ground engaging wheel rotatably mounted on said spindle; and
     (4) a steering tiller connected to said spindle;
   (b) a rear drive unit including:
     (1) a drive unit frame;
     (2) a rear axle means rotatably mounted on said drive unit frame;
     (3) a pair of spaced apart ground engaging rear wheels mounted on said rear axle means in spaced apart relation;
     (4) a motor mounted on said frame;
     (5) transmission means drivingly connecting said motor to said rear axle means; and
     (6) frame connection means removably connecting said drive unit frame to said floor pan of said main frame unit with said floor pan back end adjacent said rear wheels;
   (c) a seat unit including a seat member, said seat unit being connected to said floor pan of said main frame unit in proximity to said floor pan back end with said seat member in spaced relation to said pan;
   (d) a battery unit including a battery member, said battery unit being removably positioned on said floor pan of said main frame unit in proximity to said back end thereof; and
   (e) control means removably interconnecting said battery member with said motor to selectively operate said motor to propel said vehicle.

2. The vehicle set forth in claim 1 wherein: (a) said rear axle means includes a right axle and a left axle; (b) a differential unit connects said right and left axles; and
   (c) said transmission means drivingly connects said motor to said differential unit.

3. The vehicle set forth in claim 2 wherein:
   (a) said motor includes a motor shaft;
   (b) a motor pulley is positioned on said shaft;
   (c) said differential unit includes a differential pulley; and
   (d) said transmission means includes an endless belt trained about said motor pulley and said differential pulley.

4. The vehicle set forth in claim 3 wherein:
   (a) said motor pulley and differential pulley each include a toothed outer surface; and
   (b) said endless belt has a toothed inner surface which meshes with the toothed surfaces of said pulleys.

5. The vehicle set forth in claim 2 wherein:
   (a) said motor includes a motor shaft;
   (b) a motor pulley is positioned on said shaft;
   (c) said differential unit includes a differential pulley;
   (d) a speed reduction pulley set is positioned between said motor pulley and said differential pulley and includes a first intermediate pulley aligned with said motor pulley and a second intermediate pulley aligned with said differential pulley, said first and second intermediate pulleys being rigidly interconnected for rotation in unison;
   (e) an endless motor belt is trained about said motor pulley and said first intermediate pulley; and
   (f) an endless differential belt is trained about said differential pulley and said second intermediate pulley.

6. The vehicle set forth in claim 1 wherein:
   (a) said control means and said motor cooperate to provide more than one speed of operation in a forward direction and a reverse direction.

7. The vehicle set forth in claim 1 wherein:
   (a) said seat member is spaced substantially closer to said rear wheels than to said front wheel such that the weight of an occupant riding on said vehicle is concentrated principally on said rear wheels to thereby maximize the frictional contact of said rear wheels with a surface supporting said vehicle.

8. A personal mobility vehicle comprising:
   (a) a main frame unit including:
     (1) a floor pan having a back end;
     (2) a front wheel spindle pivotally connected to said pan;
     (3) a front ground engaging wheel rotatably mounted on said spindle; and
     (4) a steering tiller connected to said spindle;
   (b) a rear drive unit including:
     (1) a drive unit frame;
     (2) a rear axle means rotatably mounted on said drive unit frame;
     (3) a pair of spaced apart ground engaging rear wheels mounted on said rear axle means in spaced apart relation;
     (4) a motor mounted on said frame;
     (5) transmission means drivingly connecting said motor to said rear axle means; and
     (6) three substantially collinear frame connection means, at least two of which are fixed, removably connecting said drive unit frame to said floor pan of said main frame unit;
   (c) a seat unit including a seat member, said seat unit being connected to said floor pan of said main frame unit in proximity to said floor pan back end with said seat member in spaced relation to said pan;

(d) a battery unit including a battery member, said battery unit being removably positioned on said floor pan of said main frame unit in proximity to said back end thereof;

(e) a brake associated with at least one of said wheels for selectively retarding and preventing rotation of said one of said wheels; and (f) control means removably interconnecting said battery member with said motor to selectively operate said motor to propel said vehicle.

9. The vehicle set forth in claim 8 wherein:
(a) said rear wheels are differentially interconnected for rotation at mutually different rates.

10. The vehicle set forth in claim 8 wherein:
(a) said rear wheels are differentially interconnected for rotation at mutually different rates.

11. The vehicle set forth in claim 8 wherein said drive unit frame connection means includes:
(a) mortise means on one of said frame means and said drive unit frame;
(b) tenon means on the other of said frame means and said drive unit frame for reception in said mortise means; and
(c) fastener means to secure said drive unit frame to said frame means.

12. The vehicle set forth in claim 11 including:
(a) a projecting tab on one of said frame means and said drive unit frame, said tab having a first aperture therethrough;
(b) a second aperture on the other of said frame means and said drive unit frame; said first and second apertures being alignable when said tenon means is received in said mortise means; and
(c) a pin removably received in said first and second apertures when said apertures are aligned.

13. The vehicle set forth in claim 8 wherein:
(a) said steering tiller may be fixed at a selected angle with respect to said frame member.

14. The vehicle set forth in claim 8 wherein:
(a) said seat means has a hand operated lock for ease of removal from said frame means.

15. A personal mobility vehicle comprising:
(a) a main frame unit including:
 (1) a floor pan;
 (2) a front wheel spindle pivotally connected to said pan;
 (3) a front ground engaging wheel rotatably mounted on said spindle; and
 (4) a steering tiller connected to said spindle;
(b) a rear drive unit including:
 (1) a drive unit frame;
 (2) a rear axle means rotatably mounted on said drive unit frame;
 (3) a pair of spaced apart ground engaging rear wheels mounted on said rear axle means in spaced apart relation;
 (4) a motor mounted on said frame;
 (5) transmission means drivingly connecting said motor to said rear axle means; and
 (6) frame connection means removably connecting said drive unit frame to said floor pan of said main frame unit, said frame connection means including spaced, interlocking and connection means preventing rotation of said drive unit frame relative to said main frame unit.

16. The vehicle set forth in claim 15 wherein:
(a) said connection means comprises a pair of said connection means spaced from each other.

17. The vehicle set forth in claim 15 wherein said connection means includes:
(a) a projecting tab on one of said frame means and said drive unit frame, said tab having a first aperture therethrough;
(b) a second aperture on the other of said frame means and said drive unit frame, said first and second apertures being alignable; and
(c) a pin removably received in said first and second apertures.

* * * * *

REEXAMINATION CERTIFICATE (2274th)
United States Patent [19]

Kramer

[11] B1 4,570,739

[45] Certificate Issued Apr. 19, 1994

[54] PERSONAL MOBILITY VEHICLE

[75] Inventor: DuWayne E. Kramer, Mission, Kans.

[73] Assignee: Burke, Inc., Mission, Kans.

Reexamination Request:
No. 90/002,216, Nov. 30, 1990

Reexamination Certificate for:
Patent No.: 4,570,739
Issued: Sep. 29, 1983
Appl. No.: 537,297
Filed: Feb. 18, 1986

[51] Int. Cl.$^5$ ................................. B62D 61/08
[52] U.S. Cl. ...................... 180/216; 180/65.1; 180/208; 180/907; 280/DIG. 5
[58] Field of Search ............. 180/208, 907, 216, 217, 180/65.1, 55, 11, 13; 280/273, 639, DIG. 5

[56] References Cited

U.S. PATENT DOCUMENTS

| | | | |
|---|---|---|---|
| D. 178,841 | 9/1956 | Kummer | D15/15 |
| 1,046,681 | 12/1912 | Towson | 180/56 |
| 1,333,121 | 3/1920 | LaRoche | 180/216 |
| 1,348,568 | 8/1920 | Kemble | 180/21 |
| 1,984,831 | 12/1934 | Higley | 74/664 |
| 2,448,992 | 9/1948 | Love et al. | 180/23 |
| 2,495,573 | 1/1950 | Duke | 180/11 |
| 2,574,199 | 11/1951 | Tandler et al. | 180/210 |
| 2,594,034 | 4/1952 | King | 180/208 |
| 2,696,272 | 12/1954 | Schlaphoff | 180/208 |
| 2,749,997 | 6/1956 | Deslippe | 180/208 |
| 2,817,406 | 12/1957 | Brewer | 180/11 |
| 2,819,093 | 1/1958 | Geiser | 280/112.2 |
| 2,839,146 | 6/1958 | Bouffort | 180/208 |
| 2,867,449 | 1/1959 | Shawver | 280/47.18 |
| 2,910,130 | 10/1959 | Schlaphoff | 180/208 |
| 2,919,758 | 1/1960 | Newton et al. | 180/210 |
| 2,973,048 | 2/1961 | Jensen | 180/216 |
| 2,993,550 | 7/1961 | Klappert | 180/15 |
| 3,001,599 | 9/1961 | Fryar | 180/208 |
| 3,004,619 | 10/1961 | Straussler | 180/208 |
| 3,043,389 | 7/1962 | Steinberg | 180/208 |
| 3,057,425 | 10/1962 | Proett | 180/216 |
| 3,106,481 | 10/1963 | Westmont | 427/208.2 |
| 3,117,648 | 1/1964 | Landreth | 180/55 |
| 3,177,962 | 4/1965 | Bailey | 180/11 |
| 3,190,676 | 6/1965 | Junge | 280/273 |
| 3,202,234 | 8/1965 | Osborne | 180/65.7 |
| 3,212,596 | 10/1965 | Johnson | 180/208 |
| 3,213,957 | 10/1965 | Wrigley | 180/208 |
| 3,249,171 | 5/1966 | Kinghorn | 180/208 |
| 3,254,734 | 6/1966 | Behrmann | 180/19.1 |
| 3,282,365 | 11/1966 | McReynolds | 180/208 |
| 3,329,228 | 7/1967 | Harris | 180/208 |
| 3,369,629 | 2/1968 | Weiss | 180/208 |

(List continued on next page.)

FOREIGN PATENT DOCUMENTS

| | | |
|---|---|---|
| 2724553 | 12/1978 | Fed. Rep. of Germany . |
| 3128112 | 2/1983 | Fed. Rep. of Germany . |
| 2061197 | 10/1979 | United Kingdom . |
| 2127364 | 4/1984 | United Kingdom . |

OTHER PUBLICATIONS

Burke, Inc., "Important Medicare Information" Flyer, 1 page.
Burke, Inc. "An Important Message" Flyer, version 1, 2 pages, Nos. B001113 and B001114.

(List continued on next page.)

*Primary Examiner*—Kenneth R. Rice

[57] ABSTRACT

A personal mobility vehicle includes a floor pan with a rear drive unit at one end and a steerable front wheel at the other end. The drive unit is separable from the floor pan and includes spaced apart, differentially connected rear wheels, an electric motor, and belts and pulleys drivingly connecting the motor to a differential unit. The front wheel is steered by a tiller. A seat with a folding back is removably connected to the floor pan toward the pan rear end to concentrate the weight of the driver over the rear wheels to aid in traction. A brake is provided on the front wheel and is lockable for parking purposes. Each of the drive unit, seat unit, a battery, and a floor pan unit weighs less than thirty pounds such that the separated components can be easily lifted and manipulated for transportation of the vehicle between sites of use.

U.S. PATENT DOCUMENTS

| | | | |
|---|---|---|---|
| 3,486,765 | 12/1969 | Turner | 280/278 |
| 3,504,934 | 4/1970 | Wallis | 280/282 |
| 3,513,926 | 5/1970 | Paget, Jr. | 180/208 |
| 3,580,349 | 5/1971 | Brennan et al. | 180/208 |
| 3,605,929 | 9/1971 | Rolland | 180/208 |
| 3,698,502 | 10/1972 | Patin | 180/215 |
| 3,713,502 | 1/1973 | Delaney et al. | 180/205 |
| 3,749,192 | 7/1973 | Karchak, Jr. et al. | 180/6.5 |
| 3,770,289 | 11/1973 | Dougherty et al. | 280/639 |
| 3,781,031 | 12/1973 | Patin | 280/62 |
| 3,871,464 | 3/1975 | Eden | 180/19.2 |
| 3,896,891 | 7/1975 | Miltenburg et al. | 180/6.5 |
| 3,921,744 | 11/1975 | Benoit et al. | 180/13 |
| 3,924,706 | 12/1975 | Figura | 180/89.14 |
| 3,931,989 | 1/1976 | Nagamitsu | 280/283 |
| 3,941,198 | 3/1976 | Kappas | 180/11 |
| 3,945,449 | 3/1976 | Ostrow | 180/6.5 |
| 4,006,916 | 2/1977 | Patin | 280/282 |
| 4,037,678 | 7/1977 | Braune | 180/11 |
| 4,111,274 | 9/1978 | King et al. | 180/205 |
| 4,119,163 | 10/1978 | Ball | 180/6.5 |
| 4,452,327 | 6/1984 | Mowat et al. | 180/11 |
| 4,469,188 | 9/1984 | Mita | 180/215 |
| 4,503,925 | 3/1985 | Palmer et al. | 180/13 |
| 4,529,055 | 7/1985 | Gotoh et al. | 180/210 |
| 4,541,501 | 9/1985 | Kawasaki | 180/215 |

OTHER PUBLICATIONS

Burke, Inc. "An Important Message" Flyer, version 2, 2 pages, Nos. B001133 and B001134.

Burke, Inc., "An Important Message" Flyer, version 3, 2 pages, Nos. B001120 and B001121.

"Electrical Wheelchair for Crippled Children", Cockburn Centre for Engineering Design, University of Toronto, 1975.

O.C. 3 Flyer Brochure, Everest and Jennings, 1983.

"Voyager IV", Voyager Inc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 66 to column 2 line 15 and column 7 lines 23-26.

AS A RESULT OF REEXAMINATION, IT HAS BEEN DETERMINED THAT:

The present invention attempts to optimize the design of personal mobility vehicles by providing a rear wheel design wherein the rear wheels are differentially connected. The rear wheels, differential unit, motor, and a drive unit frame comprise a drive unit which is separable from a floor pan unit having the front wheel, and steering gear thereon. The seat unit is foldable for compactness and is also removable from the floor pan unit. The personal mobility vehicle according to the present invention comprises a drive unit, a floor pan unit, a seat unit, and a battery pack with each component [weighing less than thirty pounds and] being compact such that the vehicle is conveniently separated into components for lifting into a trunk of an automobile or placement in another vehicle for transportation to other sites. Further, the use of the driven rear wheels utilizes the weight of the driver to aid in traction.

When it is desired to transport the vehicle 1 to a different site of use, the vehicle may be separated into its various units and lifted into a trunk of an automobile or the like with relative ease. *Preferably, each of the modular components or various units weighs in the order of thirty pounds or less, enabling a relatively physically weak person to lift the units.*

AS A RESULT OF REEXAMINATION, IT HAS BEEN DETERMINED THAT:

The patentability of claims 1-14 are confirmed.

Claims 15-17 were previously disclaimed.

New claims 18-29 are added and determined to be patentable.

*18. A personal mobility vehicle comprising:*
  *(a) a main frame unit including:*
    *(1) a framed floor pan having a back end;*
    *(2) a front wheel spindle pivotally connected to said pan,*
    *(3) a front ground engaging wheel rotatably mounted on said spindle; and*
    *(4) a steering tiller connected to said spindle;*
  *(b) a rear drive unit including:*
    *(1) a drive unit frame;*
    *(2) a rear axle means rotatably mounted on said drive unit frame;*
    *(3) a pair of spaced apart ground engaging rear wheels mounted on said rear axle means in spaced apart relation;*
    *(4) a motor mounted on said frame;*
    *(5) transmission means drivingly connecting said motor to said rear axle means; and*
    *(6) frame connection means removably connecting said drive unit frame to said floor pan of said main frame unit with said floor pan back end adjacent said rear wheels,*
  *(c) a seat unit including a seat member, said seat unit being connected to said floor pan of said main frame unit in proximity to said floor pan back end with said seat member in spaced relation to said pan;*
  *(d) a battery unit including a battery member, said battery unit being removably positioned on said floor pan of said main frame unit in proximity to said back end thereof; and*
  *(e) control means removably interconnecting said battery member with said motor to selectively operate said motor to propel said vehicle.*

*19. A personal mobility vehicle separable into smaller modular components for ease of transport and comprising:*
  *a) a main frame unit having floor pan means with a front end and a back end, a front wheel spindle pivotally connected to said front end with a ground engaging wheel rotatably mounted on said spindle, and a steering tiller connected to said spindle;*
  *b) a rear drive unit having a drive unit frame with a front end, spaced-apart ground engaging wheels mounted on a rear axle means, said rear axle means rotatably mounted on said drive unit frame, and an electric drive motor with transmission means drivingly connecting said motor to said rear axle means;*
  *c) frame connection means for connection and disconnection of said back end of said main frame unit to said front end of said rear drive unit;*
  *d) a seat unit including a single seat member and means for connection and disconnection of said seat unit to said back end of said main frame unit adjacent said back end of said main frame unit with said seat member spaced above said floor pan means;*
  *e) battery means for powering said drive motor, with said battery means removably positioned on said floor pan means adjacent to said back end thereof; and*
  *f) control means and means for connection and disconnection of said control means with said battery means for selective operation of said motor.*

*20. The personal mobility vehicle set forth in claim 19 wherein said seat unit includes a single seat post connected to said seat member and swivel means permitting swiveling of said seat member.*

*21. A personal mobility vehicle separable into smaller modular components for ease of transport and comprising:*
  *a) a main frame unit having floor pan means with a front end and back end, a front wheel spindle pivotally connected to said front end with a ground engaging wheel rotatably mounted on said spindle, and a steering tiller connected to said spindle;*
  *b) a rear drive unit having a drive unit frame with a front end, spaced apart ground engaging wheels mounted on rear axle means, said rear axle means rotatably mounted on said drive unit frame, and an electric drive motor with transmission means drivingly connecting said motor to said rear axle means;* c) said front and rear ground engaging wheels being in a tricycle arrangement;

d) frame connection means for manually operated connection and disconnection of said back end of said main frame unit to said front end of said rear drive unit;

e) a seat unit including a single seat member and means for manually operated connection and disconnection of said seat unit to said back end of said main frame unit adjacent said back end with said seat member spaced above said floor pan means;

f) battery means for powering said drive unit with said battery means removably positioned on said floor pan means adjacent said back end thereof; and g) control means and means for manually operated connection of said control means with said battery means for selective operation of said motor.

22. The personal mobility vehicle set forth in claim 21 wherein said seat unit includes a single swivelable seat post supporting said seat member.

23. The personal mobility vehicle set forth in claim 21 wherein said battery means is positioned substantially below said seat member.

24. A personal mobility vehicle separable into smaller modular components for ease of transport and comprising:

a) a main frame unit having floor pan means with a front end and back end, a front wheel spindle pivotally connected to said front end with a ground engaging wheel rotatably mounted on said spindle, and a foldable steering tiller connected to said spindle;

b) a rear drive unit having a drive unit frame with a front end, spaced apart ground engaging wheels mounted on a rear axle means, said rear axle means rotatably mounted on said drive unit frame, and an electric drive motor with transmission means drivingly connecting said motor to said rear axle means;

c) said back end of said main frame unit, said rear drive unit and said front and rear ground engaging wheels being in a tricycle arrangement;

d) frame connection means for manually operated connection and disconnection of said back end of said main frame unit to said front end of said rear drive unit, said frame connection means including spaced side connectors and a center connector with said center connector generally extending under a seat post;

e) a seat unit including a single seat member and said seat post extending downwardly and means for manually operated connection of said seat post to said back end of said main frame unit adjacent said back end with said seat member spaced above said floor pan means;

f) battery means for powering said drive motor with said battery means removably positioned on said floor pan means adjacent said back end thereof; and g) control means and means for manually operated connection of said control means with said battery means for selective operation of said motor.

25. The personal mobility vehicle set forth in claim 24 including swivel means connecting to said seat post and said seat member and permitting swiveling of said seat member.

26. A personal mobility vehicle separable into smaller modular components for ease of transport and comprising:

a) a main frame unit having floor pan means with a front end and back end, a front wheel spindle pivotally connected to said front end with a ground engaging wheel rotatably mounted on said spindle, and a steering tiller connected to said spindle;

b) a rear drive unit having a drive unit frame with a front end, spaced apart ground engaging wheels mounted on rear axle means, said rear axle means rotatably mounted on said drive unit frame, and an electric drive motor with transmission means drivingly connecting said motor to said rear axle means;

c) said back end of said main frame unit, said rear drive unit and said front and rear ground engaging wheels being in a tricycle arrangement;

d) frame connection means including a manually withdrawable pin for manually operated connection and disconnection of said back end of said main frame unit to said front end of said rear drive unit;

e) a seat unit including a single seat member and means for manually operated connection and disconnection of said seat unit to said back end of said main frame unit adjacent said back end with said seat member spaced above said floor pan means;

f) battery means for powering said drive motor with said battery means removably positioned on said floor pan means adjacent said back end thereof; and, g) control means and means for manually operated connection of said control means with said battery means for selective operation of said motor.

27. A personal mobility vehicle separable into smaller modular components for ease of transport and comprising:

a) a main frame unit having floor pan means with a front end and back end, a front wheel spindle pivotally connected to said front end with a ground engaging wheel rotatably mounted on said spindle, and a steering tiller connected to said spindle;

b) a rear drive unit having a drive unit frame with a front end, spaced apart ground engaging wheels mounted on rear axle means, said rear axle means rotatably mounted on said drive unit frame, and an electric drive motor with transmission means drivingly connecting said motor to said rear axle means;

c) said back end of said main frame unit, said rear drive unit and said front and rear ground engaging wheels being in a tricycle arrangement;

d) frame connection means including pin members having grasping portions for connection and disconnection of said back end of said main frame unit to said front end of said rear drive unit;

e) a seat unit including a single seat member and means for manually operated connection and disconnection of said seat unit to said back end of said main frame unit adjacent said back end with said seat member spaced above said floor pan means;

f) battery means for powering said drive motor with said battery means removably positioned on said floor pan means adjacent said back end thereof; and g) control means and means for manually operated connection of said control means with said battery means for selective operation of said motor.

28. A personal mobility vehicle separable into smaller modular components for ease of transport and comprising:

a) a main frame unit having floor pan means with a front end and back end, a front wheel spindle pivotally connected to said front end with a ground engaging wheel rotatably mounted on said spindle, and a steering tiller connected to said spindle;

b) a rear drive unit having a drive unit frame with a front end, spaced apart ground engaging wheels mounted on rear axle means, said rear axle means rotatably mounted on said drive unit frame, and an electric drive motor with transmission means drivingly connecting said motor to said rear axle means;

c) said back end of said main frame unit, said rear drive unit and said front and rear ground engaging wheels being in a tricycle arrangement;
d) readily operated frame connection means for connection and disconnection of said back end of said main frame unit to said front end of said rear drive unit;
e) a seat unit including a single seat member and means for connection and disconnection of said seat unit to said back end of said main frame unit adjacent said back end with said seat member spaced above said floor pan means;
f) battery means for powering said drive motor with said battery means removably positioned on said floor pan means adjacent said back end thereof; and
g) control means and means for connection of said control means with said battery means for selective operation of said motor.

29. A personal mobility vehicle separable into smaller modular components for ease of transport and comprising:
a) a main frame unit having floor pan means with a front end and back end, a front wheel spindle pivotally connected to said front end with a ground engaging wheel rotatably mounted on said spindle, and a steering tiller connected to said spindle;
b) a rear drive unit having a drive unit frame with a front end, spaced apart ground engaging wheels mounted on rear axle means, said rear axle means rotatably mounted on said drive unit frame, and an electric drive motor with transmission means drivingly connecting said motor to said rear axle means;
c) said back end of said main frame unit, said rear drive unit and said front and rear ground engaging wheels being in a tricycle arrangement;
d) frame connection means including a withdrawable member for connection and disconnection of said back end of said main frame unit to said front end of said rear drive unit;
e) a seat unit including a single seat member and means for connection and disconnection of said seat unit to said back end of said main frame unit adjacent said back end with said seat member spaced above said floor pan means;
f) battery means for powering said drive motor with said battery means disconnectibly positioned on said floor pan means adjacent said back end thereof; and
g) control means and means for connection of said control means with said battery means for selective operation of said motor.

* * * * *